United States Patent [19]

Minuhin et al.

[11] Patent Number: 4,868,690
[45] Date of Patent: Sep. 19, 1989

[54] SELF-INITIALIZING 1,7 CODE DECODER WITH LOW SENSITIVITY TO ERRORS IN PREAMBLE

[75] Inventors: Vadim B. Minuhin; Vernon F. VonDeylen, both of Bloomington, Minn.

[73] Assignee: Magnetic Peripherals Inc., Minneapolis, Minn.

[21] Appl. No.: 218,019

[22] Filed: Jul. 12, 1988

Related U.S. Application Data

[63] Continuation-in-part of Ser. No. 116,989, Nov. 5, 1987, Pat. No. 4,823,209.

[51] Int. Cl.⁴ .................................................. G11B 5/09
[52] U.S. Cl. .......................................... 360/51; 360/40
[58] Field of Search ............................. 360/51, 39, 40

[56] References Cited

U.S. PATENT DOCUMENTS 4,688,016  9/1987  Fok ........................................ 360/40

Primary Examiner—Vincent P. Canney
Attorney, Agent, or Firm—Robert M. Angus; Joseph A. Genovese

[57] ABSTRACT

A 1,7 decoder is repeatedly initialized during reading of the synchrofield of the record. The decoder includes an oscillator responsive to the record to produce a binary read signal having a frequency f. A first divider produces a source data clock signal having a frequency $\frac{2}{3}$ f. A second divider produces a data partition clock signal having a frequency $\frac{1}{3}$ f. A phase synchronizer is responsive to the data partition clock signal to synchronize the source data clock signal. An initializer is responsive to the read signal recovered from the preamble of the record to synchronize the data partition clock signal.

6 Claims, 3 Drawing Sheets

SELF-INITIALIZING 1,7 CODE DECODER WITH LOW SENSITIVITY TO ERRORS IN PREAMBLE

CROSS-REFERENCE TO RELATED APPLICATIONS

This application is a continuation-in-part of application Ser. No. 116,989 filed Nov. 5, 1987, now U.S. Pat. No. 4,823,209 granted Apr. 18, 1989 by Vadim B. Minuhin for "1,7,2,3 Encoding/Decoding Employing 3/2 Frequency Division" and assigned to the same assignee as the present invention.

BACKGROUND OF THE INVENTION

This invention relates to data recording and recovery systems, and particularly to magnetic data storage and retrieval systems.

Run length limited codes have gained significant recognition in magnetic data storage systems due to their ability to increase density of stored data over other forms of code One such code is the (1,7,2,3) code (shortly 1,7 code), which has a minimum of 1 encoded zero between successive encoded ones and a maximum of 7 encoded zeroes between successive encoded ones, and it has a rate of ⅔, that is, source bits encoded into 3 code bits. The advantages of (1,7,2,3) type codes are described by T. Horiguchi and K. Morita, "An Optimization of Modulation Codes in Digital Recording", IEEE Transactions on Magnetics, Vol. MAG-12, pp. 740–742, Nov. 1976; G. Jacoby and R. Kost, "Binary Two-Thirds Rate Code with Full Word Look-Ahead", IEEE Transactions on Magnetics, Vol. MAG-20, pp. 709–714, Sept. 1984; P. H. Siegal, "Recording Codes for Digital Magnetic Storage", IEEE Transactions on Magnetics, Vol. MAG-21, pp. 1344–1349, September 1985. See also Cohn et al, U.S. Pat. No. 4,337,458, issued June 29, 1982.

The aforementioned Minuhin application describes an efficient self-synchronizing encoding/decoding scheme for 1,7 code. The present invention concerns a self-initialization scheme which demonstrates an extremely low sensitivity to errors in the preamble of the record. The preamble comprises a synchrofield, which is necessary for the operation of the readback phase locked loop (PLL), and a synchrobyte, which locates the beginning of the stored message. It is the practice of the industry that errors in the preamble are not corrected by the error correction codes (ECC). Hence, there exists a significant probability of incorrect decoder initialization and a loss of an entire record due to errors in the preamble, especially in the case of high density recording which is allowed by and dependent on ECC.

It is, therefore, an object of the present invention to provide an efficient self-initialization scheme for a 1,7 code decoder which is not susceptible to errors in the synchrofield of the record.

Another object of the present invention is to provide an initialization scheme for a 1,7 code decoder which is not dependent on correct synchrobyte detection.

It is still another object of the present invention to provide a flexible 1,7 code decoder which can operate with a custom defined synchrobyte(s).

SUMMARY OF THE INVENTION

In accordance with the present invention, the system of clock derivation for the 1,7 code decoder described in the aforementioned Minuhin application is repeatedly initialized during the reading of the synchrofield of the record. As a result, error in the synchrofield area (other than catastrophic error burst at the end of synchrofield which will drive the PLL out of lock) will not affect the correct initialization. The decoder is enabled to decode the synchrobyte (and the following data) shortly before the synchrobyte. Additional circuitry for fault tolerant detection of the special synchrobyte may be included, but the initialization of the decoder according to the present invention does not depend on such circuitry.

The decoder can be used in two modes of operation in respect to synchrobyte detection, corresponding to two different system configurations. In one mode, a predetermined synchrobyte code is detected by a detector. The second mode, the detection of the synchrobyte is performed in the already initialized decoder, by the customary decoding of it. An advantage of the second mode is that the synchrobyte code may be programmed, such as by firmware in a controller, for use with various systems. Fault tolerant techniques can be used for the detection o the synchrobyte.

BRIEF DESCRIPTION OF THE DRAWINGS

The above and other features of this invention will be more fully understood from the following detailed description, and the accompanying drawings, in which.

DESCRIPTION OF THE PREFERRED EMBODIMENT

Figure 1:
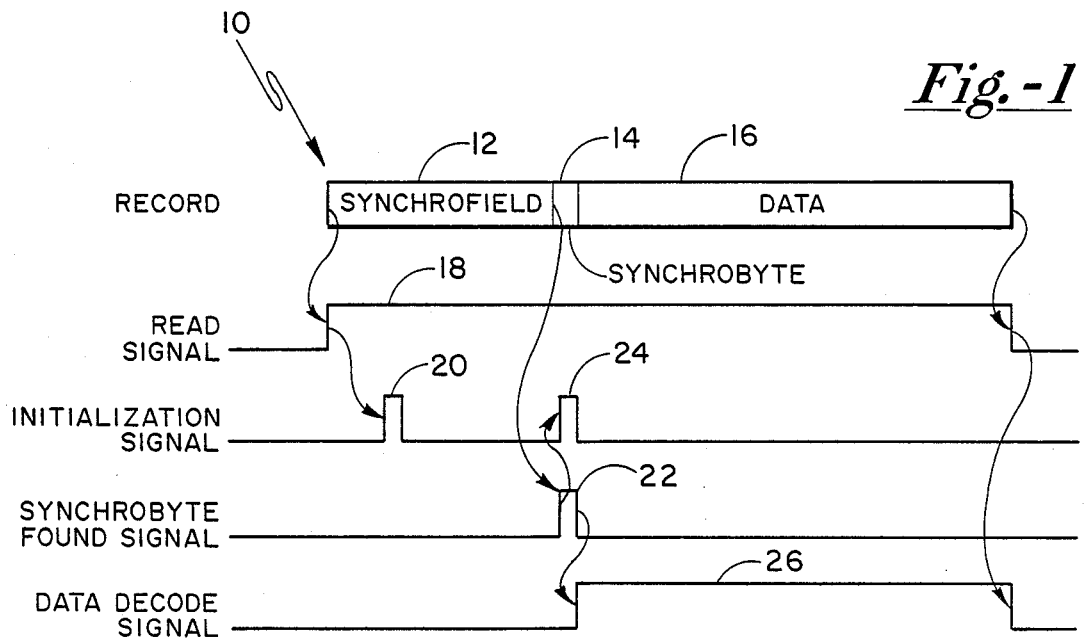
FIG. 1 is a representation of record and control signals employed in prior decoders.

Referring to the drawings, FIG. 1 illustrates a commonly used format of a written record (sector) 10 in a magnetic storage device. The record is divided into three areas: the synchrofield 12 for the readback phase locked loop (usually 15 to 30 bytes of high frequency patterns of the code), the synchrobyte 14 which identifies the beginning of the data, and the data field 16 which contains the stored message. A read/record signal 18 is high for the period of the record to operate the data separator (such as read PLL 40 in FIG. 3) to a read mode. The PLL locks to the constant frequency code pattern from the synchrofield area and, after locking, provides at its output the separated encoded data to the decoder.

In prior systems, the decoder was initialized in two techniques. In one technique of initialization, the decoder is initialized to the incoming synchrofield by an initialization signal 20, which may occur either simultaneously with the read/record signal 18 or with some delay related to it. The initialization was derived from a single periodic code pattern in the synchrofield. If the selected pattern happened to be garbled, the entire record was read incorrectly.

The second technique of initialization entailed generation of a synchrobyte found signal 22 using a separate search circuit in the decoder. The search circuit detected the synchrobyte pattern, and after detecting it, generated a synchrobyte found signal 22 which generated the initialization signal 24 for the decoder. Although a fault tolerant technique was often employed with the synchrobyte detection, if the synchrobyte was missed or mis-read, the entire record was lost Further, since the synchrofield and synchrobyte codes were factory encoded, they were not always fully suitable for custom controllers.

In any case, a data decode signal 26 was generated either from the synchrobyte 14 or the synchrobyte found signal. Signal 26 terminates with the end of record 10 (data field 16).

Figure 2:
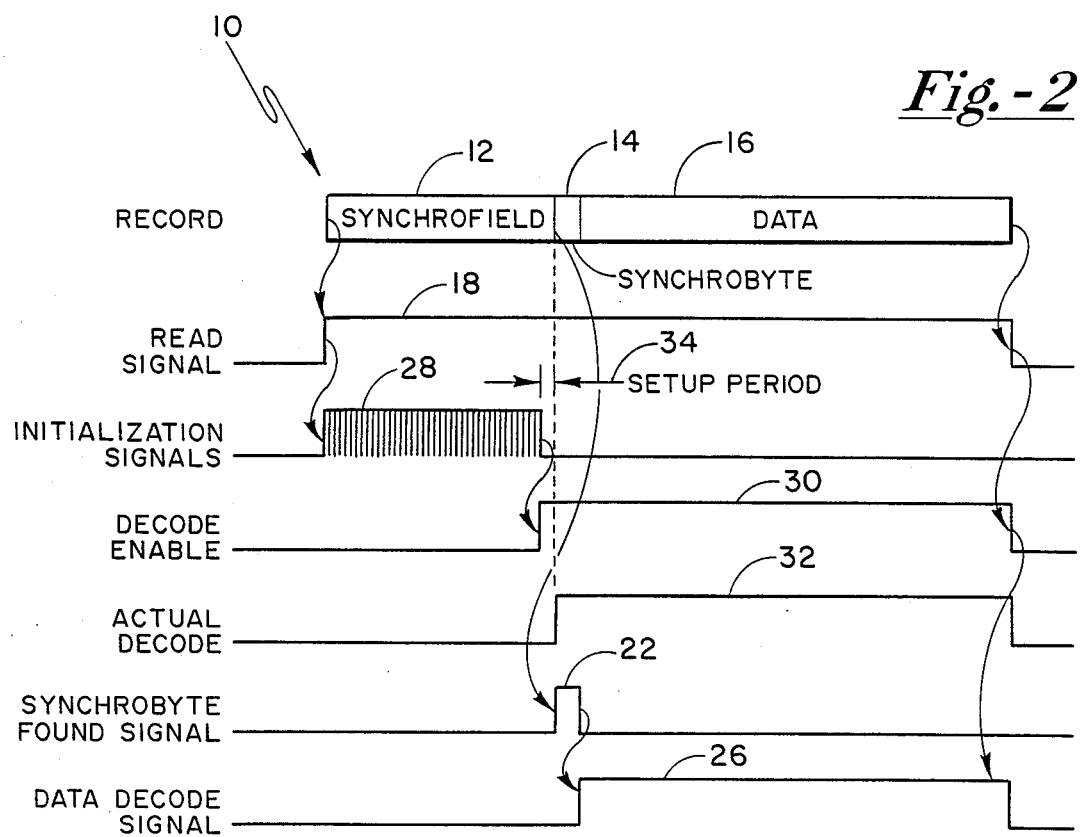
FIG. 2 is a representation of record and control signals employed in the decoder according to the present invention.

FIG. 2 illustrates the relationship between the format of the record (sector) 10 and the signals generated when the record is decoded by the decoder according to the present invention. Record 10 and read/record signal 18 are identical to those in FIG. 1. The initializing signal 28 starts simultaneously with read/record signal 18 and continues throughout almost the entire synchrofield 12. During the duration of the initializing signal 28, decoder's clock system is continuously initialized and re-initialized by the short pulses. There may be as many as two hundred of such pulses. As will be hereinafter explained, these pulses are derived from selected code patterns written in the synchrofield area which uniquely identifies the data partition in the code sequence. Errors in the synchrofield may result in some of the pulses being missed, but the proper initialization will be performed by previous and/or following pulses. The initialization procedure ends shortly before the reading of the anticipated synchrobyte 14 to permit the decoder to be enabled by signal 30 to commence actual decoding (represented by waveform 32). The synchrofield is of predetermined length, so the initialization procedure can be preestablished dependent on the known length of the synchrofield. The time interval between enabling and actual decoding of the synchrobyte is determined by the set-up period between the "write" and "read" positions of the synchrobyte, relative to the drive reference signal (usually "index" or "sector"). Generally, this set-up period is of the order of one or two bytes. The corresponding set up interval is identified by reference numeral 34 in FIG. 2. As illustrated in FIG. 2, the detection of the synchrobyte is not decoder dependent, but can be done in the controller (or in special circuitry), with any degree of sophistication. Thus, the synchrobyte found signal 22 and data decode signal 26 are generated in the controller and are not dependent on the decoder.

Figure 3:
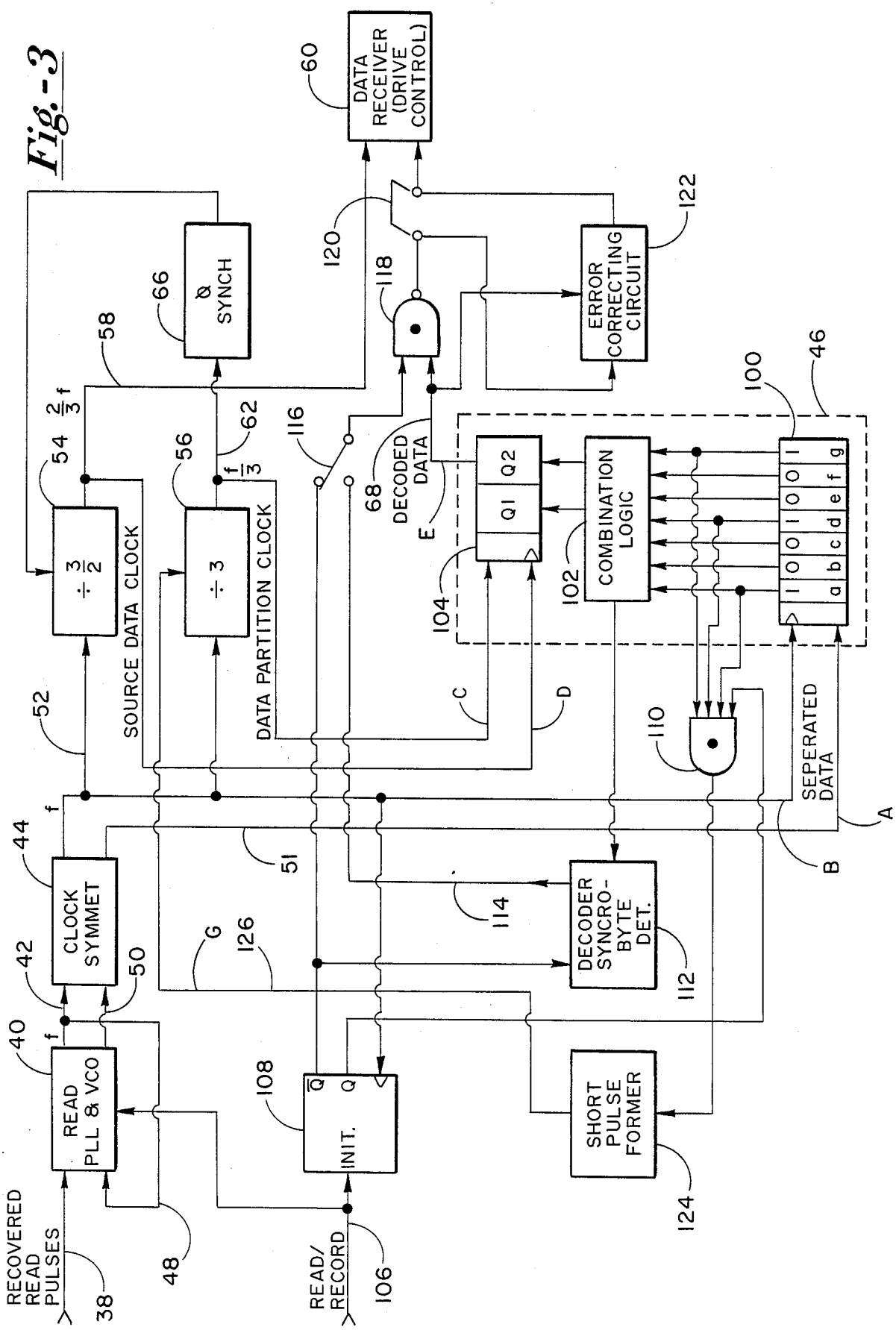
FIG. 3 is a block circuit diagram of a 1,7 decoder in accordance with the presently preferred embodiment of the present invention.

FIG. 3 illustrates a 1,7 code decoder in accordance with the presently preferred embodiment of the present invention. Recovered read signals, such as from the read heads of a magnetic disk drive (not shown) is provided via channel 38 to read phase lock loop (PLL) and voltage controlled oscillator (VCO) 40. PLL and VCO 40 provides outputs via leads 42 and 50 to clock symmetricizer 44. A feedback loop 48 from lead 42 is provided for the phase lock loop in VCO 40. Clock symmetricizer 44 provides an output consisting of separated data via channel 51 to one input of code converter 46. Clock symmetricizer 44 provides a second output via lead 52 to 3/2 divider 54, to divide by three divider 56 and as a clock input to code converter 46. Divider 54 provides a source data clock output via lead 58 to code converter 46 and to data receiver 60, which may, for example, be the drive controller for the disk drive. Divide by three divider 56 provides an output via lead 62 to the code converter 46, and to phase synchronizer 66, which in turn provides an output to divider 54. Code converter 46 provides decoded data via channel 68 to be ultimately received by data receiver 60.

The apparatus thus far described, except as to the code converter 46, is the apparatus as described in the aforementioned Minuhin application, incorporated herein by reference. Reference should be made to the Minuhin application for details as to the detection of read pluses. In the aforementioned Minuhin patent application, however, it is described that the code converter 46 may be the converter described in U.S. Pat. No. 4,337,458 issued June 29, 1982, to Cohn et al., except that signal frequencies equal to the VCO clock frequency, f, one-third f and two-thirds f, are utilized rather than frequencies of one-half, one third, and one-sixth the VCO frequency as described by Cohn et al. For the present invention, however, the code converter 46 is different from that described in the Cohn et al patent in that seven position shift register 100 replaces shift registers 62, 72 and 76 shown in FIG. 2 of Cohn et al, incorporated herein by reference.

Shift register 100 of the present invention serves both as an input storage for the combination logic 102, as well as source for decoder initialization. The input signals to shift register 100 are the separated data on channel 51 and the clock signal on channel 52. All other clock signals are derived from these signals during decoder initialization. Thus, in accordance with the present invention, code converter 46 comprises a seven position shift register 100 having seven output to combination logic 102. Logic 102 may, for example, be a read only memory (ROM), as in Cohn et al, containing a code conversion table. Separated data from clock symmetricizer 44 is clocked through shift register 100 at the frequency f on lead 52. Logic 102 analyzes the data from shift register 100 and provides parallel input to shift register 104, which has as its inputs the one-third f (data partition clock) and two-third f (source data clock). Combination logic 102 is, in essence, a hardware logic which performs two functions: first, in the "decoder synchrobyte" mode it looks for the synchrobyte for operation of synchrobyte detector 112 prior to reception of the data field 16 (FIG. 2), and secondly, in the "data decode" mode it decodes the 1,7 code to binary for operation in data receiver 60. Decoded data is provided from the output of shift register 104 onto lead 68.

Read/record signal 18 (FIG. 2) is provided via channel 106 to read PLL and VCO 40 to shift the PLL and VCO 40 to the read mode. The signal on channel 106 also provide to initializer flip-flop 108 which provides its Q output to one input of AND gate 110 and its Q-not output as an input to synchrobyte decode detector 112. AND gate 110 receives additional inputs from selected outputs of shift register 100. Preferably, and in the example given, AND gate 110 receives inputs from the first, fourth and seventh positions of shift register 100. Synchrobyte detector 112 also receives an input from combination logic 102 and provides an output via lead 114 to one terminal of switch 116. The other terminal of switch 116 is connected to the Q-not output of flip-flop 108. Switch 116 provides an output to NAND gate 118, which receives a second input from lead 68 from code converter 46. NAND gate 118 provides an output to data receiver 60, either through jumper lead 120 or through optional error correction circuit 122. If error correction circuit 122 is employed, lead 68 also provides an input to it. AND gate 110 provides an output to short pulse former 124 to provide initializing of divide by three divider 56.

Figure 4:
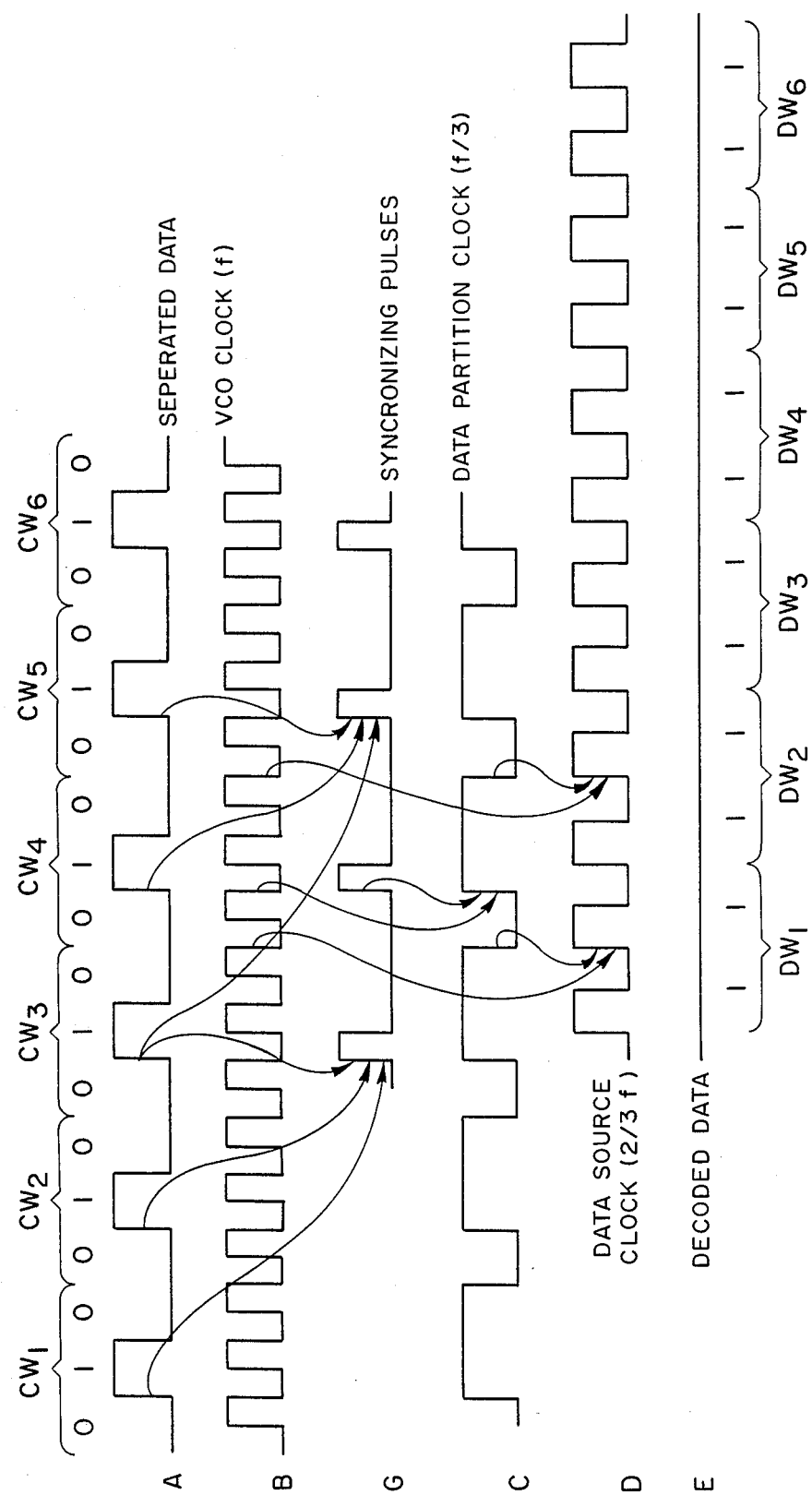
FIG. 4 is a representation of signals useful in explaining a portion of the decoder illustrated in FIG. 3.

The initialization of the decoder shown in FIG. 3 requires that data which is to be encoded in the 1,7 code encoder be complemented, i.e., original 1's are converted to 0's and vice versa. Then, at the beginning of the write cycle, when the controller supplies no data (0's) while the synchrofield is being written, the actual input to the encoder is all 1's. All 1's in the source data stream to the encoder will result in a repetitive pattern of code . . . 010 . . . written on the disk, as illustrated at waveform A in FIG. 4. This pattern identifies the boundaries and the partition for the 1,7 code words and is used in the present invention not only for the PLL look up, but also for the fault free decoder initialization. When the drive begins to read a record and a read/-record signal 18 is generated the decoder clock initialization signal 28 is also generated by the initializer 108. Initializer 108 comprises a one-shot flip-flop with a predetermined time out or a counter that counts a predetermined number of VCO clock pulses (f) supplied to its clock input from lead 52. A continuous periodic . . . 010 . . . code pattern is clocked into shift register 100 Initializer 108 provides a high Q output enabling signal to one input of the AND gate 110, whose three other inputs are connected to the outputs of bit cells a, d, and g of shift register 100. At the same time, the Q-not output of initializer 108 is low to AND gate 118, thereby disabling output from lead 68 to receiver 60. When AND gate 110 "sees" 1's in each of the connected bit cells a, d and g, gate 110 provides an output to the pulse former 124, which, is turn provides a short positive initializing pulse (waveform G in FIG. 4) on lead 126 to the overriding set/reset input of the divide by 3 circuit 56. Divider 56 is continuously and synchronously operated by the VCO clock f on the channel 52. Normally, the initializing pulses which force divider 56 into the desirable state occur when the divider 56 is already in that state. Therefore, the initializing pulses normally do not disturb the synchronous action of the divider 56. However, it is the initializing pulses that force the correct phase relationships between various clock signals shown in FIG. 4. (As explained in the aforementioned Minuhin application, divider 56 continuously provides synchronizing pulses via channel 62 and phase synchronizer 66 to the 3/2 divider 54—waveforms C and D in FIG. 4. Therefore, during initialization, the system of clock derivation of the proposed decoder has a double synchronization.) Thus, the code pattern in the synchrofield area (waveform A in FIG. 4) synchronizes the divider by 3 circuit 56 (waveform C in FIG. 4), and divider in turn synchronizes the 3/2 divider 54 (waveform D in FIG. 4.) When near the end of synchrofield, the timer of initializer 108 forces the initializer to change circuit state and interrupts initializing pulses 28 by disabling AND gate 110 Simultaneously the output from converter 46 on channel 68 is enabled by the high Q-not on lead 128 to NAND gate 118. (The inversion of decoded data in the NAND gate 118 is necessary, because, as mentioned above, the inverted source data sequence was used in the encoder to yield 010 code pattern in the synchrofield area). Then the normal decoding takes place.

In the "decoder synchrobyte" mode, the initialization of the decoder proceeds as described. However, near the end of the initialization, initializer 108 enables the synchrobyte detection circuit 112. When circuit 112 finds the synchrobyte, it (via channel 113, switch 114 and AND gate 110) enables NAND gate 110 via lead 114 and switch 116 to enable the decoder output. Normal decoding then takes place.

The decoder according to the present invention exhibits extremely low sensitivity to synchrofield errors due to the fact that the decoder is actually initialized throughout the entire synchrofield area. Any error will result in a wrong signal to AND gate 110, which will result only in the missing of the corresponding initializing pulse. Tis, however, does not affect the operation because there may be as many as two hundred initializing pulses. Further, if some catastrophic error burst occurs which results in the 1's being sensed by the bit cells of shift register 100 at a wrong time, the decoder may momentarily be initialized incorrectly, but will correct itself as soon as the error burst ends.

This invention is not to be limited by the embodiment shown in the drawings and described in the description, which is given by way of example and not of limitation, but only in accordance with the appended claims.

What is claimed is:

1. In apparatus for decoding a record comprising a preamble followed by data recorded in a 1,7,2,3 code, said apparatus comprising oscillator means responsive to said record to produce a binary read signal having a frequency f, first divider means responsive to said read signal for producing a source data clock signal having a frequency equal to ⅔ f, second divider means responsive to said read signal for producing a data partition clock signal having a frequency equal to ⅓ f, converter means responsive to said record and to said read signal and to said data partition clock signal and to said source data clock signal to decode said record from 1,7,2,3 code, and phase synchronization means responsive to said data partition clock signal to control said first divide means to phase synchronize said source data clock signal to said data partition clock signal, the improvement comprising: initializing means responsive to said preamble to control said second divider means to phase synchronize said data partition clock signal to said read signal.

2. Apparatus according to claim 1 wherein said converter means includes a shift register for storing bits of said read signal, said initializing means comprising gate means selected positions of said shift register for initializing said second divider means.

3. Apparatus according to claim 2 further including enable means responsive to said preamble for enabling said gate means.

4. Apparatus according to claim 3 wherein said preamble comprises a synchrofield followed by a synchrobyte, said initializing means further including detector means responsive to said converter means for detecting said synchrobyte and second gate means responsive to said detector means and said converter means for providing decoded data to an output.

5. Apparatus according to claim 2 wherein said preamble comprises a synchrofield followed by a synchrobyte, said initializing means further including detector means responsive to said converter means for detecting said synchrobyte and second gate means responsive to said detector means and said converter means for providing decoded data to an output.

6. Apparatus according to claim 1 wherein said preamble comprises a synchrofield followed by a synchrobyte, said initializing means further including detector means responsive to said converter means for detecting said synchrobyte and second gate means responsive to said detector means and said converter means for providing decoded data to an output.

* * * * *